US012375374B2

(12) United States Patent
Takamura

(10) Patent No.: US 12,375,374 B2
(45) Date of Patent: Jul. 29, 2025

(54) SERVER, SERVER MANAGEMENT SYSTEM, SERVER MANAGEMENT METHOD, AND SERVER MANAGEMENT PROGRAM

(71) Applicant: NEC Platforms, Ltd., Kawasaki (JP)

(72) Inventor: Nobuhito Takamura, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 268 days.

(21) Appl. No.: 17/599,648

(22) PCT Filed: Mar. 19, 2020

(86) PCT No.: PCT/JP2020/012396
§ 371 (c)(1),
(2) Date: Sep. 29, 2021

(87) PCT Pub. No.: WO2020/203363
PCT Pub. Date: Oct. 8, 2020

(65) Prior Publication Data
US 2022/0200877 A1 Jun. 23, 2022

(30) Foreign Application Priority Data
Apr. 2, 2019 (JP) .................................. 2019-070841

(51) Int. Cl.
*H04L 43/065* (2022.01)
*H04L 43/04* (2022.01)
*G08B 5/36* (2006.01)

(52) U.S. Cl.
CPC ............ *H04L 43/065* (2013.01); *H04L 43/04* (2013.01); *G08B 5/36* (2013.01)

(58) Field of Classification Search
CPC .......... H04L 43/065; H04L 43/04; G08B 5/36

USPC .......................................................... 709/224
See application file for complete search history.

(56) References Cited

U.S. PATENT DOCUMENTS

2017/0018149 A1* 1/2017 Shih ..................... H05B 47/175

FOREIGN PATENT DOCUMENTS

| JP | H09-018546 A | 1/1997 |
|---|---|---|
| JP | 2009-129418 A | 6/2009 |
| JP | 2009-154342 A | 7/2009 |
| JP | 2010-287256 A | 12/2010 |
| JP | 3170900 U | 10/2011 |
| JP | 2016-039590 A | 3/2016 |
| JP | 2016-057794 A | 4/2016 |
| JP | 2016-116159 A | 6/2016 |

(Continued)

OTHER PUBLICATIONS

International Search Report for PCT Application No. PCT/JP2020/012396, mailed on Jun. 9, 2020.

(Continued)

*Primary Examiner* — Glenford J Madamba

(57) ABSTRACT

A server includes communication means for communicating with another device via a network and light-emitting control means for controlling a light-emitting state of a light-emitting member provided in a functional unit identified by identification information based on the identification information that identifies one or more functional units that execute a predetermined function and control information that controls the light-emitting state of the light-emitting member provided in the functional unit acquired via the communication part.

15 Claims, 7 Drawing Sheets

(56) References Cited

FOREIGN PATENT DOCUMENTS

KR       2011092100 A  *  8/2011
TW        201310046 A  *  3/2013

OTHER PUBLICATIONS

Japanese Office Action for JP Application No. 2019-070841 mailed on Jun. 9, 2020 with English Translation.

* cited by examiner

SERVER, SERVER MANAGEMENT SYSTEM, SERVER MANAGEMENT METHOD, AND SERVER MANAGEMENT PROGRAM This application is a National Stage Entry of PCT/JP2020/012396 filed on Mar. 19, 2020, which claims priority from Japanese Patent Application 2019-070841 filed on Apr. 2, 2019, the contents of all of which are incorporated herein by reference, in their entirety.

TECHNICAL FIELD

The present invention relates to a server, a server management system, a server management method, and a server management program.

BACKGROUND ART

In recent years, an operation with an emphasis on the environment is required also for a data center. Therefore, it is required to suppress a power consumption of a server installed in the data center. For example, Patent Document 1 discloses a technique capable of turning off a lamp provided in a server by performing a predetermined operation on the server to suppress the power consumption. However, a role of the lamp is to display a server state or individual identification. Therefore, it is difficult to operate the server with the lamp turned off.

The server is monitored or controlled from a remote location. With the lamp provided in such a server, it is possible to operate the server with the lamp turned off. For example, Patent Document 2 discloses a technique capable of controlling a server from a remote location. Patent Document 3 discloses a technique capable of checking display of a light emitting diode (LED) of a server from a remote location. Patent Documents 4 and 5 disclose techniques capable of controlling a light amount of an LED. However, the server has a lamp that cannot be monitored and controlled from a remote location. It is necessary to maintain the lamp in a turned-on state in such a case.

PRIOR ART DOCUMENTS

Patent Documents

Patent Document 1

Japanese Utility Model (Registered) Publication No. 3170900

Patent Document 2

Japanese Unexamined Patent Application, First Publication No. 2016-057794

Patent Document 3

Japanese Unexamined Patent Application, First Publication No. 2010-287256

Patent Document 4

Japanese Unexamined Patent Application, First Publication No. 2009-154342

Patent Document 5

Japanese Unexamined Patent Application, First Publication No. 2009-129418

SUMMARY OF INVENTION

Problems to be Solved by the Invention

With the technique described in Patent Document 1, it is not possible to suppress power consumption by turning off the lamp of the server from a remote location. The technique described in Patent Document 2 can control the server from a remote location, but does not control the lamp. The technique described in Patent Document 3 is limited to checking the display of the lamp and does not control the lamp. The techniques described in Patent Documents 4 and 5 are techniques for controlling the light amount so as not to cause stress to a user standing in front of the device and do not perform power saving control of the server.

As described above, there is no technique of controlling a light-emitting state of the lamp provided in the server from the remote location.

An object of the present invention is to provide a server, a server management system, a server management method, and a program that solve the above problems.

Means for Solving the Problems

In order to achieve the aforementioned objects, a server according to a first aspect of the present invention includes communication means for communicating with another device via a network and light-emitting control means for controlling, based on identification information that identifies one or more functional units that execute a predetermined function and control information that controls a light-emitting state of a light-emitting member provided in the functional unit acquired via the communication part, the light-emitting state of the light-emitting member provided in the functional unit identified by the identification information.

A server management system according to a second aspect of the present invention includes a server management device connected to a network and a server including communication means for communicating with the server management device via the network and light-emitting control means for controlling, based on identification information that identifies one or more functional units that execute a predetermined function and control information that controls a light-emitting state of a light-emitting member provided in the functional unit acquired via the communication part, the light-emitting state of the light-emitting member provided in the functional unit identified by the identification information.

A server management method according to a third aspect of the present invention includes communicating with another device via a network and controlling, based on identification information that identifies one or more functional units that execute a predetermined function and control information that controls a light-emitting state of a light-emitting member provided in the functional unit acquired by the communicating, the light-emitting state of the light-emitting member provided in the functional unit identified by the identification information.

A server management program according to a fourth aspect of the present invention causes a computer to execute communicating with another device via a network and controlling, based on identification information that identifies one or more functional units that execute a predetermined function and control information that controls a light-emitting state of a light-emitting member provided in the functional unit acquired by the communicating, the light-emitting state of the light-emitting member provided in the functional unit identified by the identification information.

Advantageous Effects of the Invention

According to the present invention, it is possible to obtain the effect that the power consumption of the server can be suppressed from the remote location.

EXAMPLE EMBODIMENTS

First Embodiment

Hereinafter, a server management system 1 according to a first embodiment of the present invention will be described with reference to drawings.

Figure 1:
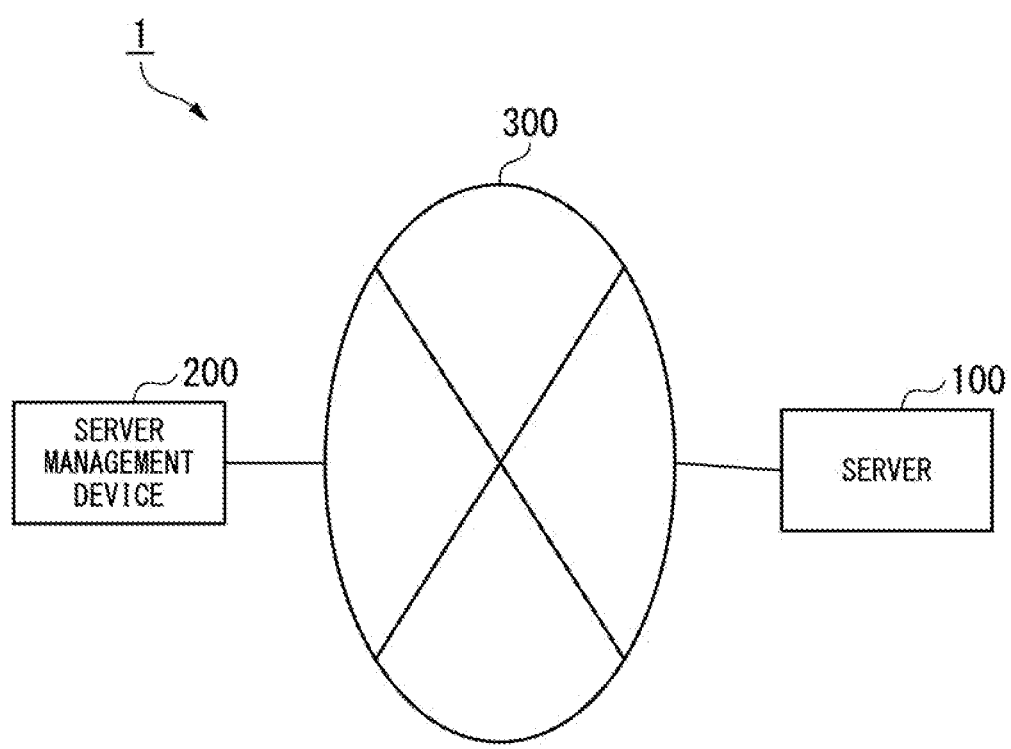
FIG. 1 is a system configuration diagram showing a server management system according to a first embodiment.

FIG. 1 is a system configuration diagram showing a system configuration of the server management system 1 according to the first embodiment. The server management system 1 includes a server 100 and a server management device 200 and is connected via a network 300. The server management system 1 manages a lamp included in the server 100 from a remote location.

Both the server 100 and the server management device 200 can communicate with each other via the network 300. The network 300 is a wide area communication network such as the Internet. The network 300 may be a network using wireless communication or a network using wired communication. The network 300 may be configured by combining a plurality of networks.

Figure 2:
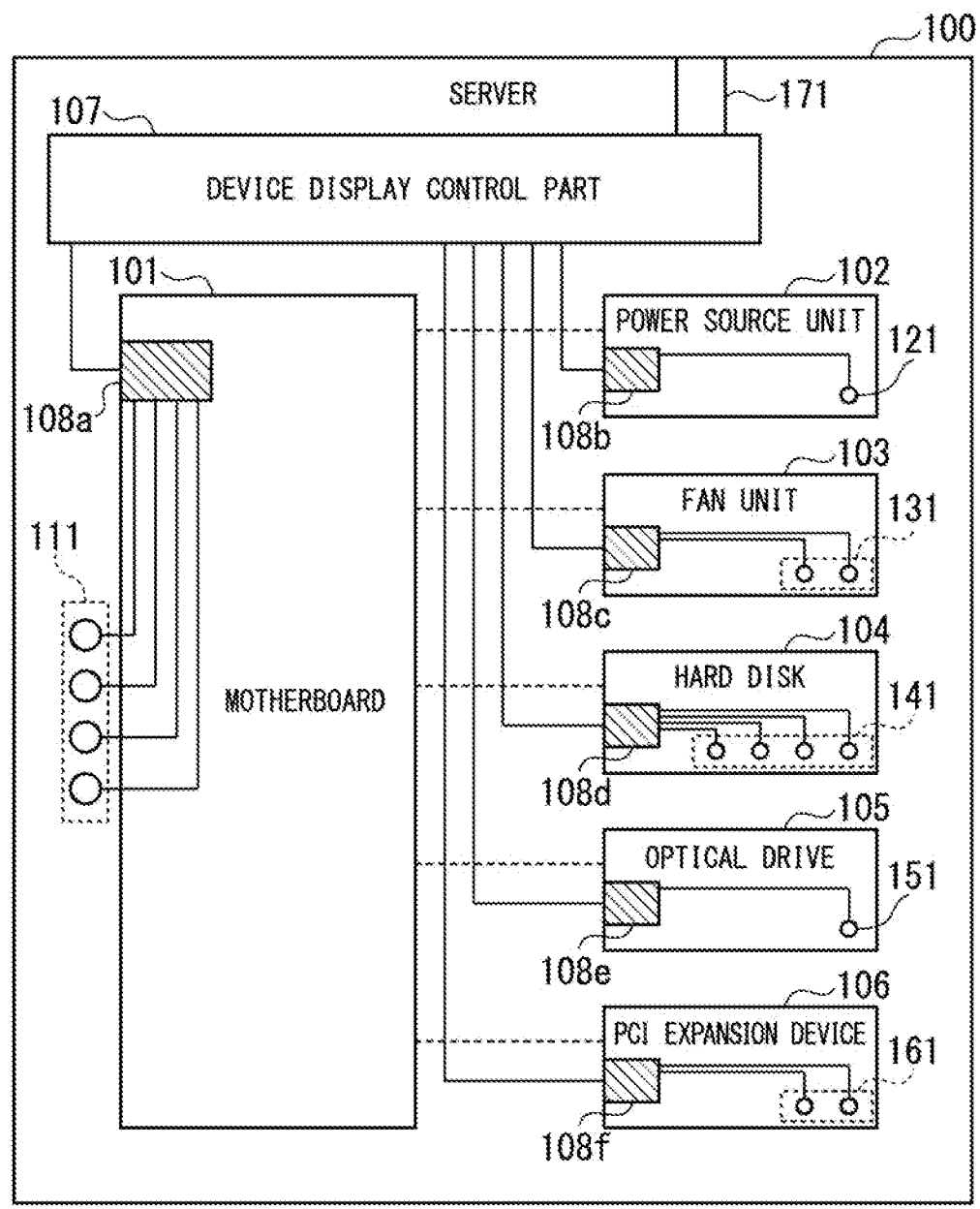
FIG. 2 is a block diagram showing a server configuration according to the first embodiment.

FIG. 2 is a hardware configuration diagram showing a configuration of the server 100 of the first embodiment. The server 100 includes a motherboard 101, a power source unit (power source circuitry) 102, a FAN unit (FAN circuitry) 103, a hard disk 104, an optical drive 105, a PCI expansion device (PCI expansion circuitry) 106, a device display control part (device display controller) 107, and a communication part (communicator) 171. In this embodiment, a device including the lamp is referred to as a unit or circuitry (functional unit or functional circuitry).

The functional unit or functional circuitry includes, for example, an apparatus such as the motherboard 101, the power source unit (power source circuitry) 102, the FAN unit (FAN circuitry) 103, the hard disk 104, the optical drive 105, and the PCI expansion device (PCI expansion circuitry) 106. Each unit or circuitry includes a light-emitting control part (light-emitting controller) 108. For example, the motherboard 101 includes a light-emitting control part (light-emitting controller) 108a. For example, the power source unit (power source circuitry) 102 includes a light-emitting control part (light-emitting controller) 108b. For example, the FAN unit (FAN circuitry) 103 includes a light-emitting control part (light-emitting controller) 108c. For example, the hard disk 104 includes a light-emitting control part (light-emitting controller) 108d. For example, the optical drive 105 includes a light-emitting control part (light-emitting controller) 108e. For example, the PCI expansion device 106 includes a light-emitting control part (light-emitting controller) 108f. Hereinafter, in a case where it is not distinguished which unit is provided with the light-emitting control part (light-emitting controller) 108, it will be described simply as the light-emitting control part (light-emitting controller) 108.

The light-emitting control part 108 is connected to the lamp included in the unit. The lamp indicates a state or situation related to a function provided by each unit. The light-emitting control part 108 outputs a lamp signal generated by each unit to the device display control part 107. The light-emitting control part 108 receives a mode signal related to a light-emitting state adjustment from the device display control part 107. The light-emitting control part 108 controls a light-emitting state of the connected lamp based on the received mode signal related to the light-emitting state adjustment. The light-emitting control part 108 is configured by using, for example, a processor such as a central processing unit (CPU) and an integrated circuit such as a memory.

The motherboard 101 is configured by using a processor such as a CPU and an integrated circuit such as a memory. The motherboard 101 performs arithmetic processing, storage processing, and control processing of the server 100. Specifically, the motherboard 101 controls the power source unit 102, the FAN unit 103, the hard disk 104, the optical drive 105, and the PCI expansion device 106. The motherboard 101 includes the light-emitting control part 108a and a device state display lamp 111.

The light-emitting control part 108a outputs the lamp signal generated inside the motherboard 101 to the device state display lamp 111. The device state display lamp 111 is a lamp that displays an operation state of the server 100. The device state display lamp 111 is, for example, a light-emitting member such as an LED or an organic electro luminescence (EL). The device state display lamp 111 emits light in response to the lamp signal. The device state display lamp 111 indicates the operation state of the server 100 according to the light-emitting state such as changing a color, turning on, turning off, blinking, or changing a light amount. The operation state of the server 100 may indicate any state as long as it indicates a state related to the operation of the server 100, such as a device state, a power supply situation, or an access situation of an onboard local area network (LAN).

The power source unit 102 receives power supply from the outside and supplies power to the server 100. The power source unit 102 converts AC power received from the outside into DC power. The power source unit 102 controls to adjust the converted DC power and distribute the power to the motherboard 101, the FAN unit 103, the hard disk 104, the optical drive 105, and the PCI expansion device 106. The power source unit 102 includes the light-emitting control part 108*b* and a unit state display lamp 121.

The light-emitting control part 108*b* outputs the lamp signal generated inside the power source unit 102 to the unit state display lamp 121. The unit state display lamp 121 is a lamp that displays a device state of the power source unit 102. The unit state display lamp 121 is, for example, a light-emitting member such as an LED or an organic EL. The unit state display lamp 121 emits light in response to the lamp signal. The unit state display lamp 121 indicates the operation state of the power source unit 102 according to the light-emitting state such as changing a color, turning on, turning off, blinking, or changing a light amount. For example, the unit state display lamp 121 indicates the operation state of the power source unit 102 by blinking when the AC power is supplied, turning on when the DC power is supplied, or turning off when none of the power is supplied.

The FAN unit 103 is a unit that cools the apparatuses, such as the unit and the device, that configure the server 100. The FAN unit 103 is controlled to supply an appropriate air volume by a signal from an external apparatus such as the motherboard 101. The FAN unit 103 includes the light-emitting control part 108*c* and a unit state display lamp 131.

The light-emitting control part 108*c* outputs the lamp signal generated inside the FAN unit 103 to the unit state display lamp 131. The unit state display lamp 131 is a lamp that displays the device state of the FAN unit 103. The unit state display lamp 131 is, for example, a light-emitting member such as an LED or an organic EL. The unit state display lamp 131 emits light in response to the lamp signal. The unit state display lamp 131 indicates the operation state of the FAN unit 103 according to the light-emitting state such as changing a color, turning on, turning off, blinking, or changing a light amount. For example, the unit state display lamp 131 indicates the operation state of the FAN unit 103 by turning on when a fan provided in the FAN unit 103 is rotating normally or blinking when the fan is not rotating normally. A plurality of unit state display lamps 131 may be provided according to the application.

The hard disk 104 is an auxiliary storage device. The hard disk 104 stores data used by the server 100. The hard disk 104 includes the light-emitting control part 108*d* and a unit state display lamp 141.

The light-emitting control part 108*d* outputs the lamp signal generated inside the hard disk 104 to the unit state display lamp 141. The unit state display lamp 141 is a lamp that displays the device state of the hard disk 104. The unit state display lamp 141 is, for example, a light-emitting member such as an LED or an organic EL. The unit state display lamp 141 emits light in response to the lamp signal. The unit state display lamp 141 indicates the operation state of the hard disk 104 according to the light-emitting state such as changing a color, turning on, turning off, blinking, or changing a light amount. For example, the unit state display lamp 141 indicates the operation state of the hard disk 104 by turning on, turning off, blinking, or changing a light amount according to the operation state such as when writing is performed on the hard disk 104, when data is read from the hard disk 104, or when an error occurs. A plurality of unit state display lamps 141 may be provided according to the application.

The optical drive 105 is an optical disk reading device that reads the data written on an optical disk such as a compact disc read only memory (CD-ROM), a digital versatile disc read only memory (DVD-ROM), or a Blu-Ray Disc. The optical drive 105 includes the light-emitting control part 108*e* and a unit state display lamp 151. The optical drive 105 may be an optical disk writing device that writes the data to the optical disk.

The light-emitting control part 108*e* outputs the lamp signal generated inside the optical drive 105 to the unit state display lamp 151. The unit state display lamp 151 is a lamp that displays the device state of the optical drive 105. The unit state display lamp 151 is, for example, a light-emitting member such as an LED or an organic EL. The unit state display lamp 151 emits light in response to the lamp signal. The unit state display lamp 151 indicates the operation state of the optical drive 105 according to the light-emitting state such as changing a color, turning on, turning off, blinking, or changing a light amount. For example, the unit state display lamp 151 indicates the operation state of the optical drive 105 by turning on, turning off, blinking, or changing a light amount according to the operation state such as when the optical drive 105 reads data from an optical disc, when the optical drive 105 writes data to an optical disc, or when an error occurs in reading or writing data.

The PCI expansion device 106 is an expansion device connected by a peripheral component interconnect (PCI) bus. The PCI expansion device 106 is attached with a card conforming to a specification of the PCI expansion device 106 according to the purpose and application. The card may be, for example, a graphic accelerator, a disk controller, or a network card. The PCI expansion device 106 includes the light-emitting control part 108*f* and a unit state display lamp 161. The PCI bus may be a device of another standard such as PCI Express.

The light-emitting control part 108*f* outputs the lamp signal generated inside the PCI expansion device 106 to the unit state display lamp 161. The unit state display lamp 161 is a lamp that displays the device state of the PCI expansion device 106. The unit state display lamp 161 is, for example, a light-emitting member such as an LED or an organic EL. The unit state display lamp 161 emits light in response to the lamp signal. The unit state display lamp 161 indicates the operation state of the PCI expansion device 106 according to the light-emitting state such as changing a color, turning on, turning off, blinking, or changing a light amount. For example, a case where the network card is attached to the PCI expansion device 106 will be described. In this case, the unit state display lamp 161 indicates the operation state of the PCI expansion device 106 by turning on, turning off, blinking, or changing a light amount according to a link state with the network or the operation state of the network card such as an amount of traffic in communication. A plurality of unit state display lamps 161 may be provided according to the application.

The device display control part 107 outputs the mode signal related to the light-emitting state adjustment to each light-emitting control part 108. The device display control part 107 receives the lamp signal from the light-emitting control part 108. The device display control part 107 transmits the received lamp signal to the server management device 200 via the communication part 171. The device display control part 107 is configured by using a processor such as a CPU and an integrated circuit such as a memory. The mode signal is an aspect of control information. The control information is information that controls the light-emitting state of the light-emitting member provided in the functional unit. The control information is associated with information related to the light-emitting state of the light-emitting member.

The communication part 171 is a communication device such as a network interface. The communication part 171 is communicably connected to the network 300 by a predetermined protocol. The communication part 171 communicates the data with the server management device 200 via the network 300 under the control of the device display control part 107.

Figure 3:
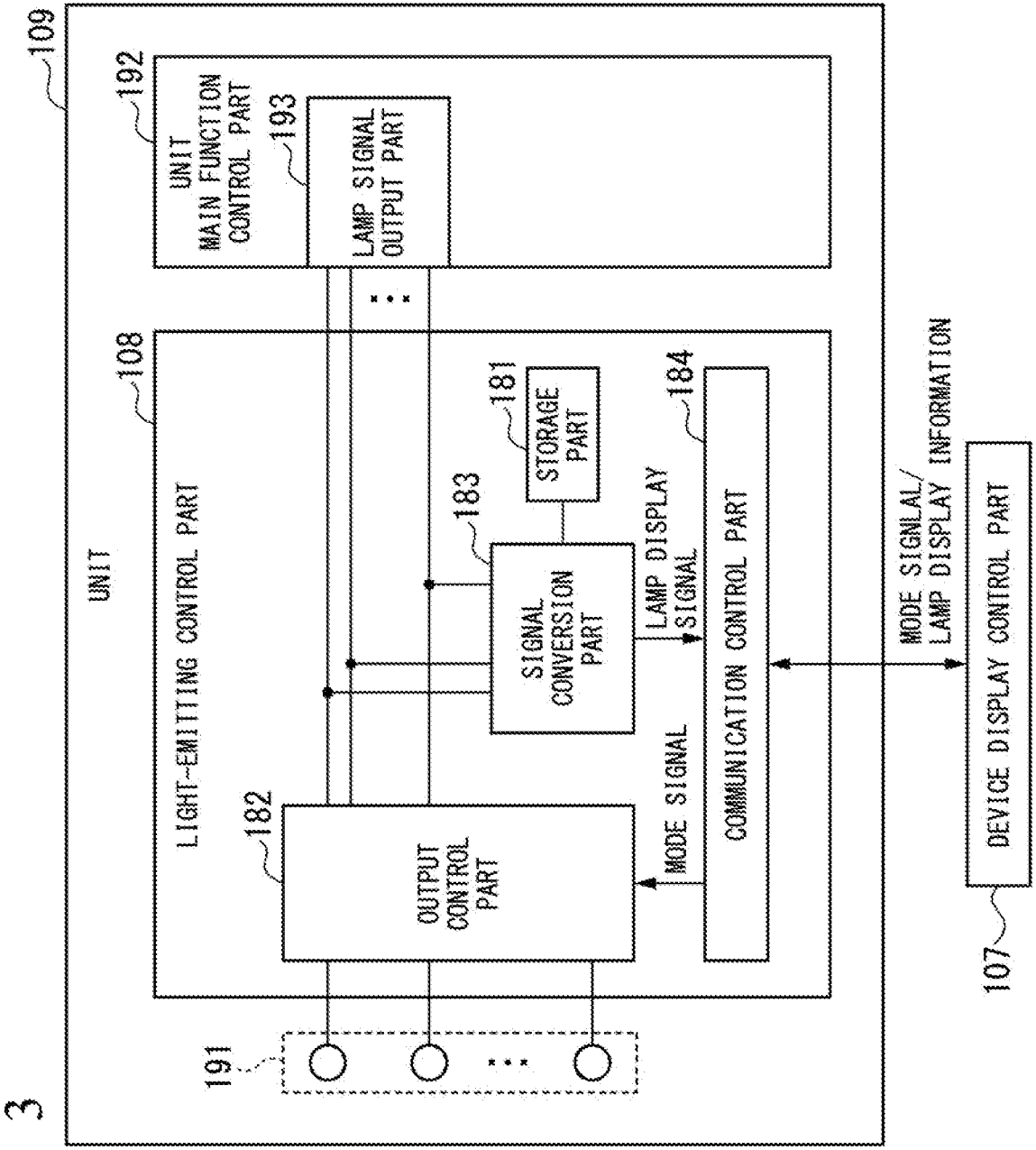
FIG. 3 is a block diagram showing a function of each unit according to the first embodiment.

FIG. 3 is a functional block diagram showing a functional configuration of the unit of the first embodiment. A unit 109 corresponds to the motherboard 101, the power source unit 102, the FAN unit 103, the hard disk 104, the optical drive 105, and the PCI expansion device 106 shown in FIG. 2. The unit 109 includes the light-emitting control part 108, a state display lamp 191, and a unit main function control part 192. The light-emitting control part 108 includes a storage part 181, an output control part 182, a signal conversion part 183, and a communication control part 184. The unit main function control part 192 includes a lamp signal output part 193. The state display lamp 191 is an aspect of the device state display lamp 111 or the unit state display lamp. Hereinafter, in a case where the device state display lamp 111 and the unit state display lamp are not distinguished, it will be described simply as the state display lamp 191. The unit 109 is an aspect of the functional unit. The functional unit is an apparatus that configures the server 100. The functional unit executes a predetermined function related to its own device. The predetermined function may be, for example, supply of a power source or cooling of another functional unit.

The unit main function control part 192 provides a main function of the unit 109. For example, in a case where the unit 109 is a power source unit, the unit main function control part 192 receives the power supply from the outside and supplies the power to the server 100.

The lamp signal output part 193 generates the lamp signal based on the operation state of the unit main function control part 192. The lamp signal is a signal indicating turning on, turning off, or color of the state display lamp 191. The lamp signal output part 193 outputs the generated lamp signal. A plurality of wirings extending from the lamp signal output part 193 to the output control part 182 correspond one-to-one with the state display lamp 191. The lamp signal output part 193 outputs the lamp signal to a predetermined wiring based on the operation state of the unit main function control part 192.

The storage part 181 is configured by using a storage device such as a magnetic hard disk device or a semiconductor storage device. The storage part 181 stores unit identification information. The unit identification information is information that uniquely identifies the unit 109 provided in the server 100. The unit identification information may be configured of a plurality of characters or numbers. The unit identification information may be any information as long as it is different from another unit 109 provided in the server 100. The unit identification information is stored in the storage part 181 in advance. The unit identification information is an aspect of the identification information. The identification information is information that uniquely identifies the functional unit.

The output control part 182 is connected to the state display lamp 191. The output control part 182 adjusts the light-emitting state of the state display lamp 191. Specifically, the output control part 182 receives the lamp signal from the lamp signal output part 193. The output control part 182 receives the mode signal from the communication control part 184. The output control part 182 adjusts an output current output to the state display lamp 191 based on the lamp signal and the mode signal. The output control part 182 outputs the adjusted output current to the state display lamp 191 to adjust the light-emitting state. The mode signal is a signal that determines the light-emitting state of the state display lamp 191. The mode signal may have a plurality of types such as turning off, dimming, and normal or enhancing (changing light amount). The output current may be associated with the type of the mode signal. The output current may be, for example, 0% in the case of turning off, 20% in the case of dimming, 50% in the case of normal, and 80% in the case of enhancing and is not limited thereto. The output control part 182 may hold in advance a table in which the output current is associated with the type of the mode signal. The state display lamp 191 is an aspect of the light-emitting member. The light-emitting member is provided in the functional unit. The light-emitting member is a lamp that displays the state of the functional unit. The light-emitting member is, for example, an LED or an organic EL.

The signal conversion part 183 receives the lamp signal output by the lamp signal output part 193. The signal conversion part 183 generates lamp display information based on the received lamp signal. The lamp display information is information indicating a state related to turning on or turning off of the state display lamp 191. The lamp display information may be represented by a binary value such as 0 or 1. The lamp display information may indicate, for example, turning off when the value is 0 and turning on when the value is 1. The signal conversion part 183 may determine the lamp display information to 0 or 1 according to signal intensity of the received lamp signal. The signal conversion part 183 may generate a plurality of pieces of lamp display information according to a length of time that the lamp signal is received. The signal conversion part 183 compresses the lamp display information generated from the lamp signal. For example, the signal conversion part 183 may compress the generated lamp display information by sampling the information. The signal conversion part 183 acquires unit identification information from the storage part 181. The signal conversion part 183 associates the compressed lamp display information with the acquired unit identification information and outputs the associated information to the communication control part 184. The lamp display information is an aspect of the display information. The display information is information that causes another device to display the light-emitting state of the light-emitting member generated by the functional unit.

The communication control part 184 is connected to the device display control part 107. The communication control part 184 receives the information in which the lamp display information and the unit identification information are associated with each other from the signal conversion part 183. When the information in which the lamp display information and the unit identification information are associated with each other is acquired, the communication control part 184 outputs the acquired information to the device display control part 107. The communication control part 184 receives the mode signal from the device display control part 107. The communication control part 184 outputs the received mode signal to the output control part 182.

The device display control part 107 receives the information in which the mode signal and the unit identification information are associated with each other from the server management device 200 via the communication part 171.

The device display control part 107 outputs the mode signal to the unit identified by the unit identification information.

Figure 4:
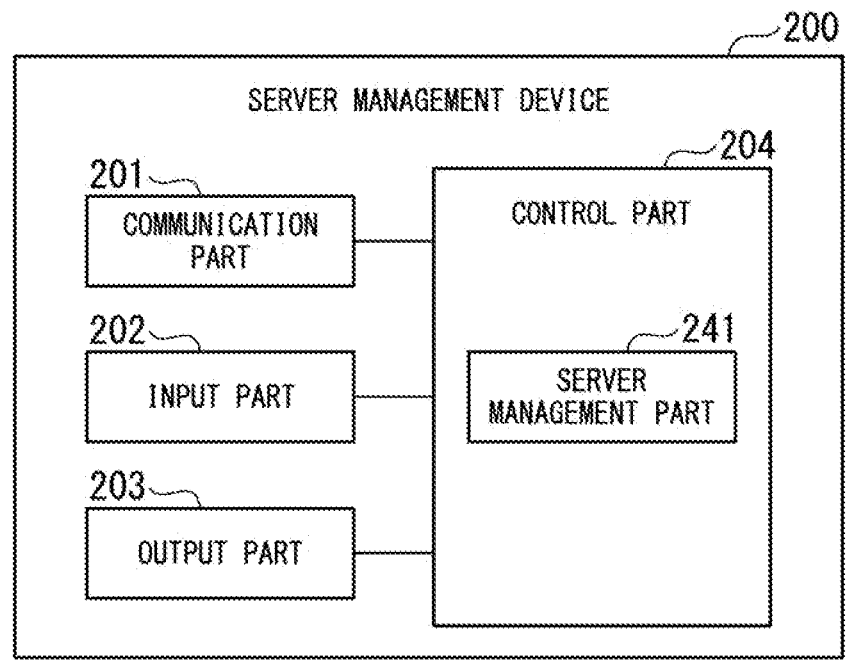
FIG. 4 is a block diagram showing a server management device according to the first embodiment.

FIG. 4 is a functional block diagram showing a functional configuration of the server management device 200 of the first embodiment. The server management device 200 is configured by using an information processing device such as a personal computer, a smart device, or a tablet computer. The server management device 200 includes a communication part 201, an input part 202, an output part 203, and a control part 204.

The communication part 201 is a communication device such as a network interface. The communication part 201 is communicably connected to the network 300 by a predetermined protocol. The communication part 201 communicates the data with another device via the network 300 under the control of the control part 204.

The input part 202 is configured by using existing input devices such as a keyboard, a pointing device (mouse, tablet, or the like), a button, and a touch panel. The input part 202 is operated when an instruction from the user of the server management device 200 is input to the server management device 200. The input part 202 may be an interface for connecting the input device to the server management device 200. In this case, the input part 202 inputs an input signal generated in response to the input of the user of the server management device 200 in the input device to the server management device 200. The user of the server management device 200 may be, for example, a person who suppresses a power consumption of the server 100 or a person who monitors and controls the server 100. The user of the server management device 200 may be any person who manages the server 100.

The output part 203 outputs the data to the user of the server management device 200 via an output device (not shown) connected to the server management device 200. The output device may be configured by using, for example, a device that outputs an image or a character to a screen. For example, the output device can be configured by using a cathode ray tube (CRT), a liquid crystal display, an organic EL display, or the like. Further, the output device may be configured by using a device that prints an image or a character on a sheet. For example, the output device can be configured by using an inkjet printer, a laser printer, or the like. The output device may be configured by using a device that converts a character into voice and outputs the voice. In this case, the output device can be configured by using a voice synthesizing device and a voice output device (speaker). The output device may be configured by using a light-emitting device such as an LED. The output part 203 may transmit a determination result to another information processing device via a communication device provided in the server management device 200.

The control part 204 is configured by using a processor such as a CPU and a memory. The control part 204 functions as the server management part 241 when the processor executes a specific program.

The server management part 241 executes a predetermined server management program to communicate with the server 100. For example, the server management part 241 transmits the mode signal to the server 100. For example, the server management part 241 receives the information in which the lamp display information and the unit identification information are associated with each other from the server 100.

First, a case where the server management device 200 transmits the mode signal to the server 100 will be described. The server management part 241 outputs a turned-on state of the device state display lamp or the unit state display lamp provided in the server 100 to the output part 203. The user of the server management device 200 operates the input part 202 based on the turned-on state output to the output part 203. Specifically, the user of the server management device 200 inputs the mode signal and the unit identification information to the server management device 200 by operating the input part 202.

The input mode signal is any one of a plurality of types of mode signals such as turning off, dimming, and normal or enhancing (changing light amount). The unit identification information to be input is any one of the units provided in the server 100, such as the motherboard 101, the power source unit 102, the FAN unit 103, the hard disk 104, the optical drive 105, or the PCI expansion device 106. The server management part 241 associates the input mode signal with the unit identification information and transmits the associated information to the server 100 via the communication part 201. The unit identification information to be input may be two or more. In this case, the server management part 241 may be configured to associate the input plurality of pieces of unit identification information with the mode signal and transmit the associated information to the server 100.

Next, a case where the server management device 200 receives the information in which the lamp display information and the unit identification information are associated with each other from the server 100 will be described. The server management part 241 receives the information in which the lamp display information and the unit identification information are associated with each other from the server 100 via the communication part 201. The server management part 241 generates a management screen based on the lamp display information and the unit identification information. The management screen is a screen showing the turned-on state of the lamp provided in the server 100. For example, a case where the server management part 241 receives information in which the turning on as the lamp display information is associated with the power source unit 102 as the unit identification information will be described.

In this case, the server management part 241 generates the management screen indicating a state in which the state display lamp 191 provided in the unit 109 is turned on. The server management part 241 outputs the generated management screen to the output part 203. The output part 203 outputs the output management screen. A display state of the state display lamp 191 output as the management screen does not depend on the mode signal. For example, when the lamp display information indicates the turning on even in a case where the turning off is input as the mode signal, the output part 203 outputs the management screen indicating that the turned-on state of the state display lamp 191 is turning on.

Figure 5:
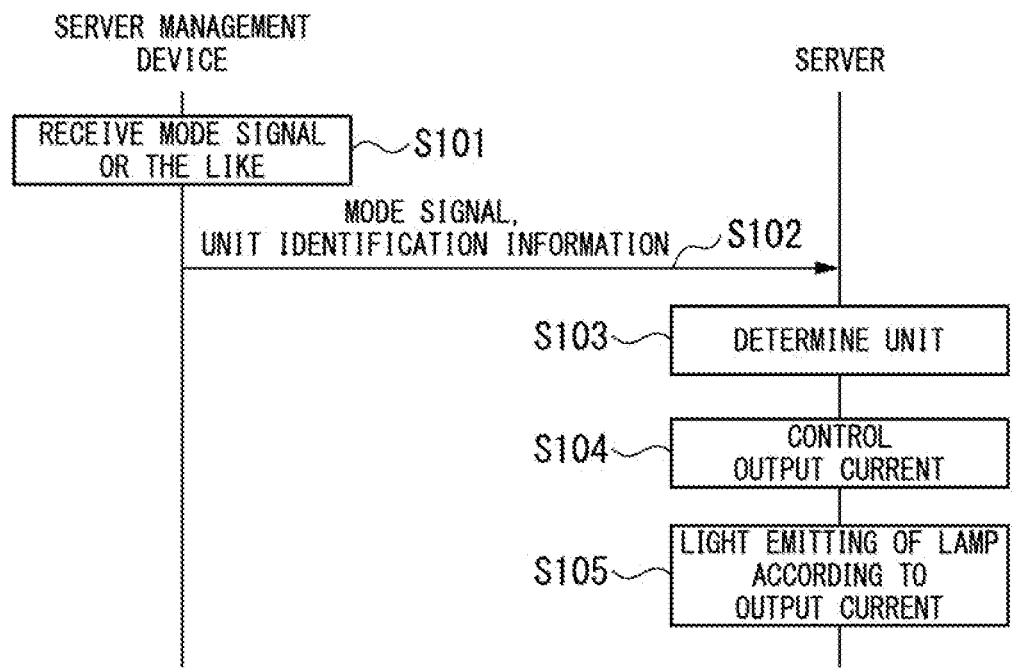
FIG. 5 is a sequence chart showing processing of controlling a light-emitting state of a state display lamp according to the first embodiment.

FIG. 5 is a sequence chart showing a specific example of a flow of processing of controlling the light emitting of the state display lamp of the first embodiment. The sequence chart shown in FIG. 5 is executed in a case where the mode signal is input from the user of the server management device 200. The output part 203 of the server management device 200 outputs the management screen. The user of the server management device 200 operates the input part 202 based on the management screen output to the output part 203. The input part 202 receives the mode signal based on the operation of the user (step S101). The input part 202 receives the unit identification information together with the mode signal. The server management part 241 associates the input mode signal with the unit identification information and transmits the associated information to the server 100 via the communication part 201 (step S102).

The device display control part 107 of the server 100 receives the information in which the mode signal and the unit identification information are associated with each other. The device display control part 107 determines the unit 109 that outputs the received mode signal (step S103). Specifically, the device display control part 107 determines to output the mode signal to the unit 109 identified by the unit identification information. The output control part 182 controls the output current based on the mode signal (step S104). Specifically, the output control part 182 controls the output current associated with the received mode signal. The unit state display lamp emits light in the light-emitting state corresponding to the controlled output current and the lamp signal generated by the lamp signal output part 193 (step S105).

Figure 6:
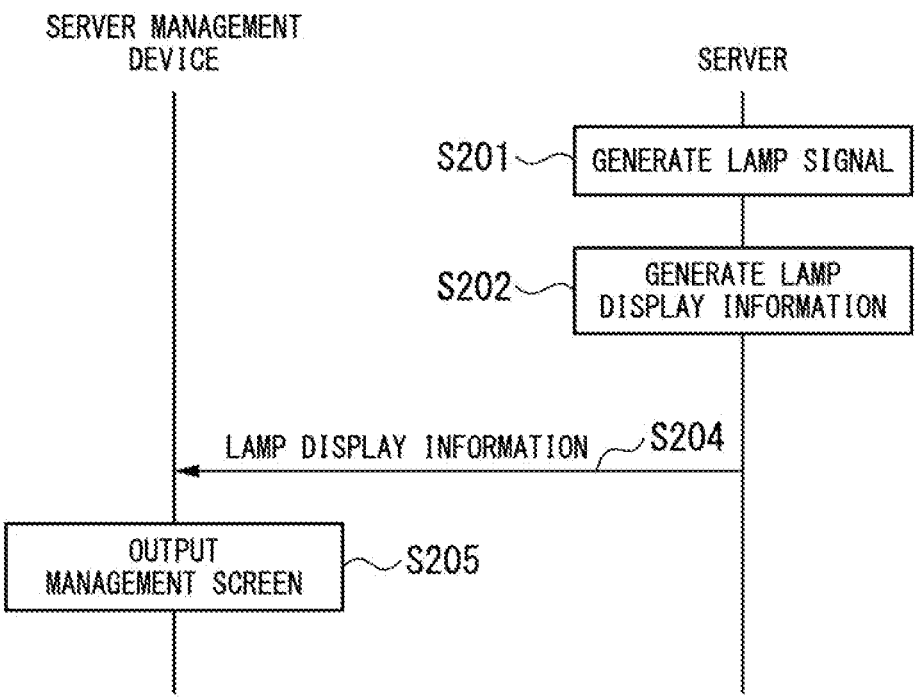
FIG. 6 is a sequence chart showing processing of displaying a turned-on state of the state display lamp according to the first embodiment.

FIG. 6 is a sequence chart showing a specific example of a flow of processing of displaying the turned-on state of the state display lamp of the first embodiment. The sequence chart shown in FIG. 6 is executed in a case where the lamp signal is generated by the server 100. The lamp signal output part 193 generates the lamp signal based on the operation state of the unit main function control part 192 (step S201). The signal conversion part 183 receives the lamp signal output by the lamp signal output part 193.

The signal conversion part 183 generates the lamp display information based on the received lamp signal (step S202). Specifically, the signal conversion part 183 determines the lamp display information to 0 or 1 according to the signal intensity of the received lamp signal. The signal conversion part 183 compresses the generated lamp display information by sampling the information. The signal conversion part 183 acquires unit identification information from the storage part 181. The signal conversion part 183 associates the compressed lamp display information with the acquired unit identification information and outputs the associated information to the communication control part 184.

The communication control part 184 receives the information in which the lamp display information and the unit identification information are associated with each other from the signal conversion part 183. When the information in which the lamp display information and the unit identification information are associated with each other is acquired, the communication control part 184 outputs the acquired information to the device display control part 107. The device display control part 107 transmits the information in which the lamp display information and the unit identification information are associated with each other to the server management device 200 (step S203). The server management part 241 of the server management device 200 generates the management screen for displaying the turned-on state of the lamp based on the lamp display information and the unit identification information. The output part 203 outputs the generated management screen (step S205).

In the server management system 1 configured in this manner, the unit 109 includes the light-emitting control part 108. The unit 109 is an apparatus included in the server 100, such as the motherboard 101, the power source unit 102, the FAN unit 103, the hard disk 104, the optical drive 105, and the PCI expansion device 106. The server 100 receives the mode signal that determines the state of light emitting of the lamp. The light-emitting control part 108 controls the current of the lamp according to the mode signal to adjust the light-emitting state of the lamp. Therefore, the server management system 1 can control the light-emitting state of the lamp from the remote location. Therefore, the server 100 can suppress the power consumption of the server 100 by receiving the mode signal related to turning off or dimming.

The server 100 receives the information in which the unit identification information that identifies the unit provided in the server 100 and the mode signal are associated with each other. With this configuration, it is possible to control the light-emitting state of the lamp for each unit included in the server 100. Therefore, the server management device 200 can integrate the lamps included in the server 100 for each unit and control the lamps from the remote location.

Further, the server 100 associates the lamp display information with the unit identification information and transmits the associated information to the server management device 200. The output part 203 of the server management device 200 outputs the generated management screen based on the lamp display information and the unit identification information. The management screen displays the turned-on state of the lamp. In this manner, the server management device 200 can aggregate and output the lamps included in the server 100. Therefore, it is possible to remotely monitor the situation of all the lamps provided in the server 100. Even in a case where the lamp included in the server 100 is turned off, it is possible to monitor the state of the server 100 from the remote location. Therefore, it is possible to suppress the power consumption of the server 100.

Second Embodiment

Figure 7:
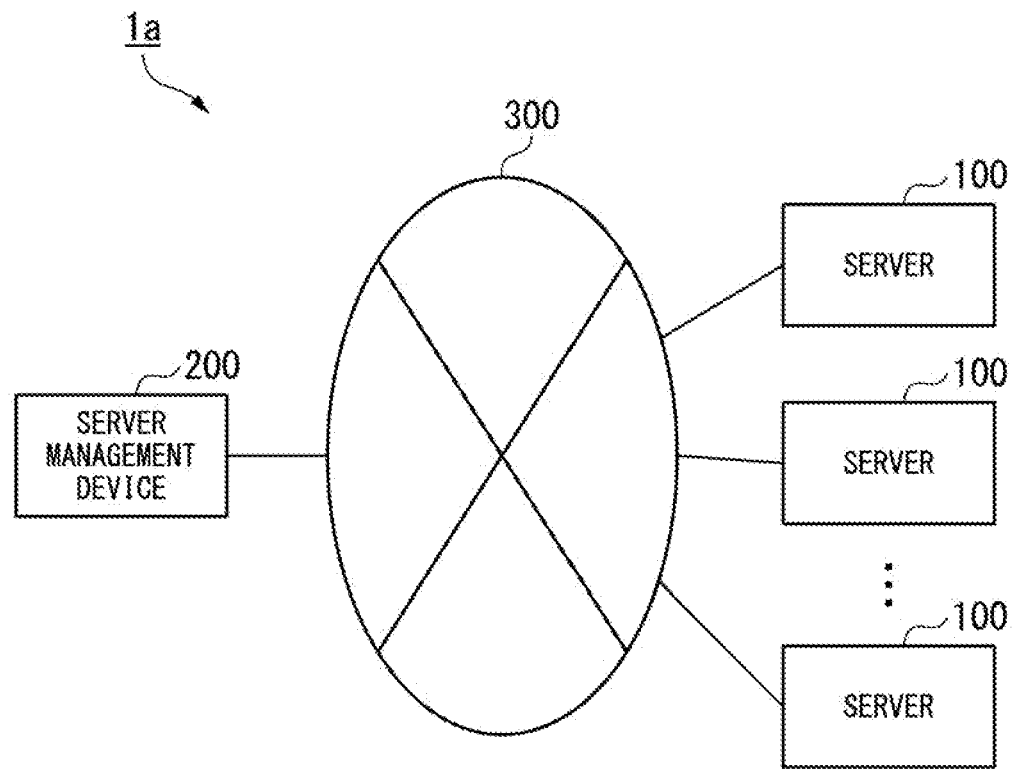
FIG. 7 is a system configuration diagram showing a server management system according to a second embodiment.

Next, a server management system 1*a* according to a second embodiment will be described. FIG. 7 is a system configuration diagram showing a system configuration of the server management system 1*a* according to the second embodiment. The server management system 1*a* in the second embodiment is different from the first embodiment in that a plurality of servers 100 are included, but the other configurations are the same. Hereinafter, the point different from the first embodiment will be described.

The server management system 1*a* according to the second embodiment includes the plurality of servers 100. The server management device 200 of the server management system 1*a* aggregates information of the server 100 via the network 300 in an environment in which the plurality of servers 100 are installed. The environment in which the plurality of servers 100 are installed is, for example, a server room or a data center. The server management device 200 controls the lamp with respect to the server 100 in the same procedure as in the first embodiment.

In a case where the plurality of servers 100 are installed in the server room or the data center, the servers 100 may be installed in the same rack at a high density without gaps. The server 100 is operated for various reasons, such as failure or maintenance timing. When the server 100 is operated, a maintenance person enters an installation place such as the server room or the data center. However, in a case where the servers 100 of the same type are installed at high density in the same rack as described above, it is difficult for the maintenance person to find the server to be operated, find a part to be replaced of the server, and distinguish the part from a similar part adjacent to the part, or the like. Such installation causes an operational mistake or an identification mistake by the maintenance person or causes a decrease in work efficiency.

Figure 8:
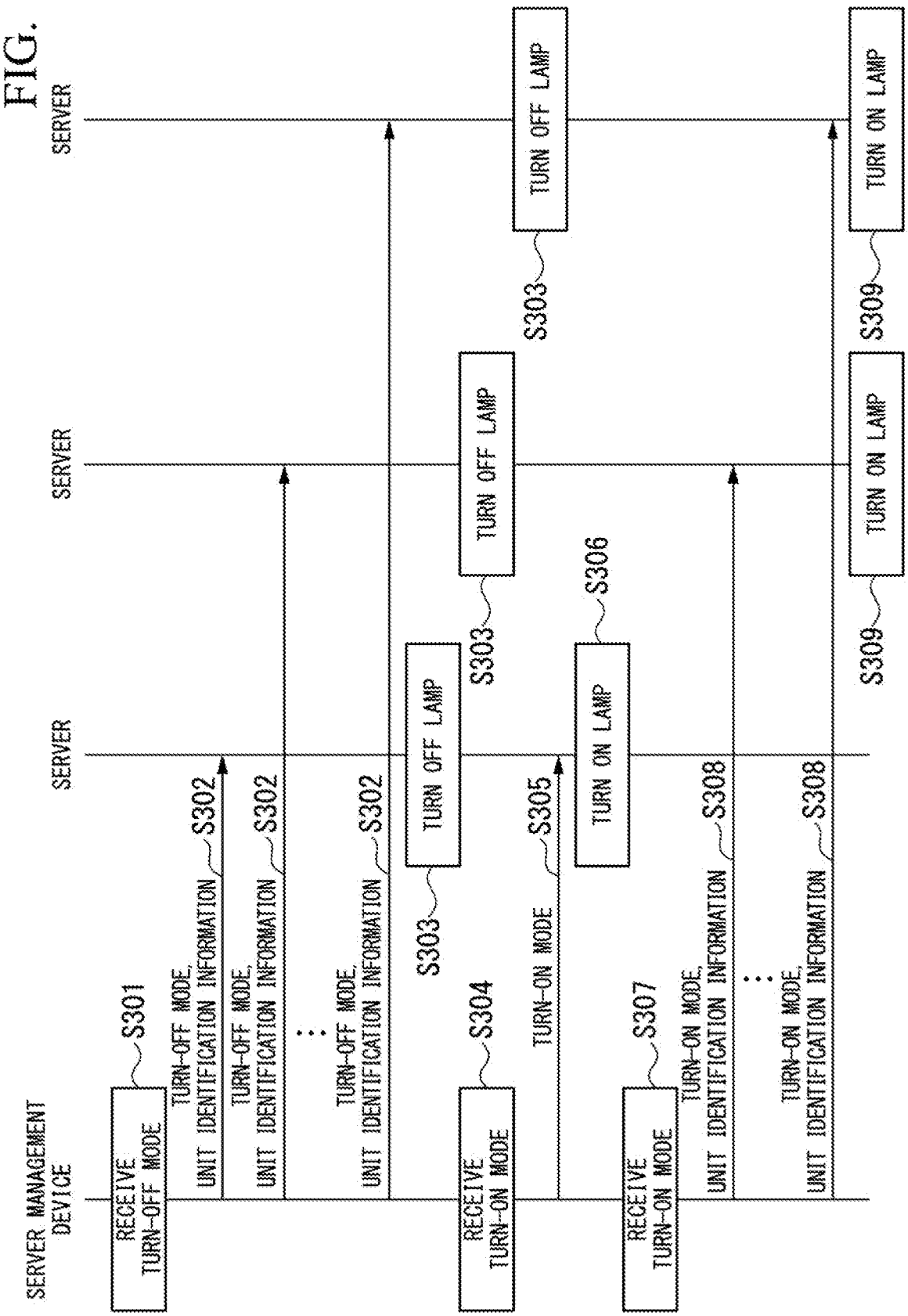
FIG. 8 is a sequence chart showing a flow of maintenance for a server according to the second embodiment.

FIG. 8 is a sequence chart showing a flow of maintenance for the server 100 according to the second embodiment. The sequence chart shown in FIG. 8 is executed when the maintenance person performs maintenance work on the server 100. The maintenance work is, for example, resolving failure that occurs in the server 100 or periodic maintenance. The input part 202 of the server management device 200 receives the mode signal based on the operation from the user of the server management device 200 (step S301). The input part 202 receives a turn-off mode as the mode signal. The input part 202 may receive the unit identification information together with the mode signal. In this case, the input part 202 receives the unit identification information of units included in all the servers 100 connected to the network 300. The server management part 241 of the server management device 200 associates the input turn-off mode (mode signal) with the unit identification information and transmits the associated information to all the servers 100 via the communication part 201 (step S302).

Each server 100 turns off the lamp (step S303). Specifically, the device display control part 107 of the server 100 receives the information in which the mode signal and the unit identification information are associated with each other. The device display control part 107 outputs the mode signal to all the units. The output control part 182 controls a unit output current based on the mode signal to turn off the lamp.

Next, the input part 202 receives the mode signal based on the operation from the user of the server management device 200 (step S304). The input part 202 receives a turn-on mode as the mode signal. The input part 202 receives the unit identification information together with the mode signal. In this case, the input part 202 receives the unit identification information related to the unit included in the server 100 to be maintained.

The input part 202 may receive only the unit identification information related to a unit to be maintained. The input part 202 may receive a different mode signal for the unit to be maintained. For example, a mode signal such as a dimming mode signal or the turn-off mode may be received by a unit other than the unit to be maintained. The server management part 241 associates the input turn-on mode (mode signal) with the unit identification information and transmits the associated information to the server 100 to be maintained via the communication part 201 (step S305).

The server 100 to be maintained turns on the lamp (step S306). Specifically, the device display control part 107 receives the information in which the mode signal and the unit identification information are associated with each other. The device display control part 107 outputs the mode signal to the unit identified by the unit identification information. The output control part 182 controls the unit output current based on the mode signal to turn on the lamp. In this manner, the server management system 1a can turn on the lamp only for the server 100 to be maintained. In a case where a different turn-on mode (for example, dimming mode or turn-off mode) is received for the unit to be maintained, the server 100 can make the unit to be maintained conspicuous. The maintenance person can more easily specify the server 100 to be maintained and perform the maintenance work.

When the maintenance work by the maintenance person ends, the input part 202 receives the mode signal based on the operation from the user of the server management device 200 (step S307). The input part 202 receives a turn-on mode as the mode signal. The input part 202 receives the unit identification information together with the mode signal. In this case, the input part 202 receives the unit identification information of the unit included in the server 100 other than the maintenance target server 100 connected to the network 300. The server management part 241 associates the input turn-on mode (mode signal) with the unit identification information and transmits the associated information to the server 100 other than the server 100 to be maintained via the communication part 201 (step S308). The server 100 turns on the lamp (step S309). Specifically, the device display control part 107 of the server 100 receives the information in which the mode signal and the unit identification information are associated with each other. The device display control part 107 outputs the mode signal to all the units. The output control part 182 controls the unit output current based on the mode signal to turn on the lamp.

In the server management system 1a configured in this manner, it is possible to control the state display lamp 191 for the plurality of servers 100 from the remote location. Therefore, when the maintenance work is performed on the server 100, it is possible to turn on only the server 100 to be maintained from the remote location. Therefore, even in a case where the servers 100 are installed in the same rack at high density without gaps in the server room, the data center, or the like, it is possible to easily find the server 100 to be worked and improve the work efficiency.

With the server management device 200 included in the server management system 1a, it is possible to check the turned-on state of the state display lamps 191 of the plurality of servers 100 from the remote location. The server management device 200 can turn on the state display lamp 191 from the remote location as necessary. Therefore, it is not necessary to keep the state display lamp 191 turned on all the time in the server room or the data center where entry is restricted from a viewpoint of security. In the server management system 1, the state display lamp 191 of the server 100 installed in the server room or the data center is turned off during normal operation. Accordingly, the server 100 can suppress power consumption.

Figure 9:
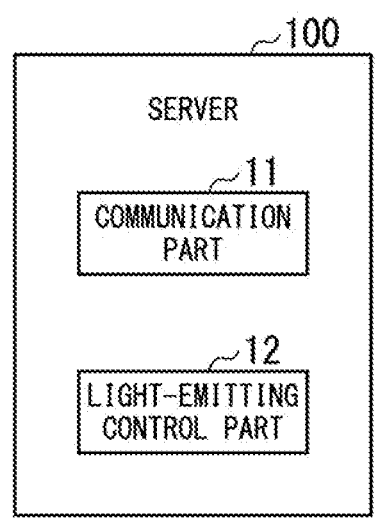
FIG. 9 is a block diagram showing a minimum configuration of a server according to the present invention.

FIG. 9 is an explanatory diagram showing a minimum configuration of the server 10 according to the present invention. The server 10 shown in FIG. 9 includes a communication part 11 and a light-emitting control part 12. With such a configuration, the communication part 11 communicates with another device via the network. The light-emitting control part 12 controls the light-emitting state of the light-emitting member provided in the functional unit that configures its own device and is identified by identification information, based on the identification information that identifies one or more functional units that execute a predetermined function related to the own device and the control information that controls the light-emitting state of the light-emitting member provided in the functional unit acquired via the communication part. Accordingly, it is possible to control the light-emitting state of the light-emitting member provided in the server 10 from the remote location in the server 10. Therefore, when the lamp is not necessary, it is possible to further save power in the server 10 by turning off, dimming, or otherwise reducing power supplied to the lamp.

MODIFICATION EXAMPLE

In the server management system of the first and second embodiments described above, the mode signal is controlled for each unit, but the mode signal is not limited thereto. For example, the server management device 200 may be configured to control the turn-on state for each lamp. In this case, the input part 202 further receives the input of the lamp identification information in addition to the mode signal and the unit identification information. The lamp identification information is information that can uniquely identify the lamp provided in the unit. In this case, the output control part 182 controls the output current for the lamp identified by the lamp identification information. With this configuration, the server management device 200 can control the lamp in more detail. Therefore, the server management system can suppress the power consumption of the server 100. The lamp identification information is an aspect of light-emitting member identification information. The light-emitting member identification information uniquely identifies the light-emitting member provided in the functional unit.

The server 100 and the server management device 200 described above have a computer system inside. Steps of controlling and remotely monitoring the light-emitting state of the lamp described above are stored in a computer-readable recording medium in the form of a program. The program is read out and executed by a computer to perform the above processing. The computer-readable recording medium refers to a magnetic disk, a magneto-optical disk, a CD-ROM, a DVD-ROM, a semiconductor memory, or the like. This computer program may be distributed to the computer via a communication line, and the computer receiving the distribution may execute the program.

A program for realizing the functions of the device display control part 107 and the light-emitting control part 108 in FIG. 3 and the functions of the control part 204 in FIG. 4 may be recorded on the computer-readable recording medium and the program recorded on the recording medium may be read and executed by the computer system to realize the functions of the device display control part 107 and the light-emitting control part 108 in FIG. 3 and the functions of the control part 204 in FIG. 4. The term "computer system" herein includes an OS or hardware such as a peripheral apparatus. The "computer system" also includes a WWW system provided with a homepage providing environment (or display environment). The term "computer-readable recording medium" refers to a portable medium, such as a flexible disk, a magneto-optical disk, a ROM, or a CD-ROM, a storage device, such as a hard disk built in the computer system, and the like. Further, the "computer-readable recording medium" includes a medium that holds the program for a certain period of time such as a volatile memory (RAM) inside the computer system that serves as a server or a client in a case where the program is transmitted via a network such as the Internet or a communication line such as a telephone line.

The program may be transmitted from a computer system in which this program is stored in a storage device or the like to another computer system via a transmission medium or by a transmission wave in the transmission medium. The "transmission medium" that transmits the program refers to a medium having a function of transmitting information such as a network (communication network) such as the Internet or a communication line such as a telephone line. The above program may be for realizing a part of the above functions. Further, the above program may be a so-called difference file (difference program) may be used, which can realize the above functions in combination with the program already recorded in the computer system.

The present application claims priority with respect to Japanese Patent Application No. 2019-70841 filed in Japan on Apr. 2, 2019, the contents of which are incorporated herein by reference.

INDUSTRIAL APPLICABILITY

The present invention relates to the server and the server management method applied to the server management system.

REFERENCE SIGNS LIST

1: Server management system
10, 100: Server
101: Motherboard
102: Power source unit
103: FAN unit
104: Hard disk
105: Optical drive
106: PCI expansion device
107: Device display control part
12, 108: Light-emitting control part
109: Unit
111: Device state display lamp
121, 131, 141, 151, 161: Unit state display lamp
11, 171, 201: Communication part
181: Storage part
182: Output control part
183: Signal conversion part
184: Communication control part
191: State display lamp
192: Unit main function control part
193: Lamp signal output part
200: Server management device
202: Input part
203: Output part
204: Control part
241: Server management part
300: Network

What is claimed is:
1. A server comprising:
a communicator configured to communicate with another device via a network;
a first functional circuitry that executes a first function and includes a first light-emitter;
a second functional circuitry that executes a second function and includes a second light-emitter, the second function being different from the first function; and
a light-emitting controller configured to respectively control, based on first and second identification information that respectively identify the first and second functional circuitry, first and second mode signals that respectively control light amounts of the first and second light-emitters and are respectively acquired via the communicator in association with the first and second identification information, and first and second lamp signals respectively generated based on operation states of the first and second functional circuitry, the first and second light-emitters respectively provided in the first and second functional circuitry identified by the first and second identification information to respectively indicate the operation states of the first and second functional circuitry in the light amounts respectively controlled by the first and second mode signals,
wherein each of the first and second functional circuitry includes at least one of a motherboard, a power source, a fan, and a PCI expansion device of the server, the second functional circuitry including at least one of the motherboard, the power source, the fan, and the PCI expansion device other than that included in the first functional circuitry,
wherein when the first or second functional circuitry includes the motherboard, the first or second lamp signal generated in the first or second functional circuitry including the motherboard indicates operation state of the server including a device state, a power supply situation, and an access situation of an onboard local area network (LAN).

2. A server comprising:
a communicator configured to communicate with another device via a network;
a first functional circuitry that executes a first function and includes a first light-emitter;
a second functional circuitry that executes a second function and includes a second light-emitter, the second function being different from the first function; and
a light-emitting controller configured to respectively control, based on first and second identification information that respectively identify the first and second functional circuitry, first and second mode signals that respectively control light amounts of the first and second light-emitters and are respectively acquired via the communicator in association with the first and second identification information, and first and second lamp signals respectively generated based on operation states of the first and second functional circuitry, the first and second light-emitters respectively provided in the first and second functional circuitry identified by the first and second identification information to respectively indicate the operation states of the first and second functional circuitry in the light amounts respectively controlled by the first and second mode signals,
wherein each of the first and second functional circuitry includes at least one of a motherboard, a power source, a fan, and a PCI expansion device of the server, the second functional circuitry including at least one of the motherboard, the power source, the fan, and the PCI expansion device other than that included in the first functional circuitry,
wherein when the first or second functional circuitry includes the power source, the first or second lamp signal generated in the first or second functional circuitry including the power source indicates operation state including that an AC power is supplied, a DC power is supplied, and none of the power is supplied.

3. A server comprising:
a communicator configured to communicate with another device via a network;
a first functional circuitry that executes a first function and includes a first light-emitter;
a second functional circuitry that executes a second function and includes a second light-emitter, the second function being different from the first function; and
a light-emitting controller configured to respectively control, based on first and second identification information that respectively identify the first and second functional circuitry, first and second mode signals that respectively control light amounts of the first and second light-emitters and are respectively acquired via the communicator in association with the first and second identification information, and first and second lamp signals respectively generated based on operation states of the first and second functional circuitry, the first and second light-emitters respectively provided in the first and second functional circuitry identified by the first and second identification information to respectively indicate the operation states of the first and second functional circuitry in the light amounts respectively controlled by the first and second mode signals,
wherein each of the first and second functional circuitry includes at least one of a motherboard, a power source, a fan, and a PCI expansion device of the server, the second functional circuitry including at least one of the motherboard, the power source, the fan, and the PCI expansion device other than that included in the first functional circuitry,
wherein when the first or second functional circuitry includes the fan, the first or second lamp signal generated in the first or second functional circuitry including the fan indicates operation state including whether or not the fan is rotating normally.

4. A server comprising:
a communicator configured to communicate with another device via a network;
a first functional circuitry that executes a first function and includes a first light-emitter;
a second functional circuitry that executes a second function and includes a second light-emitter, the second function being different from the first function; and
a light-emitting controller configured to respectively control, based on first and second identification information that respectively identify the first and second functional circuitry, first and second mode signals that respectively control light amounts of the first and second light-emitters and are respectively acquired via the communicator in association with the first and second identification information, and first and second lamp signals respectively generated based on operation states of the first and second functional circuitry, the first and second light-emitters respectively provided in the first and second functional circuitry identified by the first and second identification information to respectively indicate the operation states of the first and second functional circuitry in the light amounts respectively controlled by the first and second mode signals,
wherein each of the first and second functional circuitry includes at least one of a motherboard, a power source, a fan, and a PCI expansion device of the server, the second functional circuitry including at least one of the motherboard, the power source, the fan, and the PCI expansion device other than that included in the first functional circuitry,
wherein when the first or second functional circuitry includes the PCI expansion device, the first or second lamp signal generated in the first or second functional circuitry including the PCI expansion device indicates an operation state including a link state with the network and the operation state of the network card including an amount of traffic in communication.

5. The server according to claim 1, further comprising:
a device display controller configured to transmit, to the another device, display information that respectively displays the light amounts of the first and second light-emitters respectively generated by the first and second functional circuitry to the another device via the communicator.

6. The server according to claim 1,
wherein the light-emitting controller controls current outputs to the first and second light-emitters based on output currents associated with the first and second mode signals to respectively control the light amounts of the first and second light-emitters, respectively.

7. The server according to claim 1,
wherein the first and second functional circuitry respectively include a plurality of the first and second light-emitters, and
the light-emitting controller controls the light amounts of the plurality of the first and second light-emitters identified by light-emitter identification information that identifies the first and second light-emitters acquired via the communicator based on the first and second light-emitter identification information.

8. A server management system comprising:
a server management device connected to a network; and
a server including:
   a communicator for communicating with the server management device via the network;
   a first functional circuitry that executes a first function and includes a first light-emitter;
   a second functional circuitry that executes a second function and includes a second light-emitter, the second function being different from the first function; and
   a light-emitting controller for controlling, based on first and second identification information that respectively identify the first and second functional circuitry, first and second mode signals that respectively control light amounts of the first and second light-emitters and are respectively acquired via the communicator in association with the first and second identification information, and first and second lamp signals respectively generated based on operation states of the first and second functional circuitry, the first and second light-emitters respectively provided in the first and second functional circuitry identified by the first and second identification information to respectively indicate the operation states of the first and second functional circuitry in the light amounts respectively controlled by the first and second mode signals,
wherein each of the first and second functional circuitry includes at least one of a motherboard, a power source, a fan, and a PCI expansion device of the server, the second functional circuitry including at least one of the motherboard, the power source, the fan, and the PCI expansion device other than that included in the first functional circuitry,
wherein when the first or second functional circuitry includes the motherboard, the first or second lamp signal generated in the first or second functional circuitry including the motherboard indicates operation state of the server including a device state, a power supply situation, and an access situation of an onboard local area network (LAN).

9. A server management system comprising:
a server management device connected to a network; and
a server including:
   a communicator for communicating with the server management device via the network;
   a first functional circuitry that executes a first function and includes a first light-emitter;
   a second functional circuitry that executes a second function and includes a second light-emitter, the second function being different from the first function; and
   a light-emitting controller for controlling, based on first and second identification information that respectively identify the first and second functional circuitry, first and second mode signals that respectively control light amounts of the first and second light-emitters and are respectively acquired via the communicator in association with the first and second identification information, and first and second lamp signals respectively generated based on operation states of the first and second functional circuitry, the first and second light-emitters respectively provided in the first and second functional circuitry identified by the first and second identification information to respectively indicate the operation states of the first and second functional circuitry in the light amounts respectively controlled by the first and second mode signals,
wherein each of the first and second functional circuitry includes at least one of a motherboard, a power source, a fan, and a PCI expansion device of the server, the second functional circuitry including at least one of the motherboard, the power source, the fan, and the PCI expansion device other than that included in the first functional circuitry,
wherein when the first or second functional circuitry includes the power source, the first or second lamp signal generated in the first or second functional circuitry including the power source indicates operation state including that an AC power is supplied, a DC power is supplied, and none of the power is supplied.

10. A server management system comprising:
a server management device connected to a network; and
a server including:
   a communicator for communicating with the server management device via the network;
   a first functional circuitry that executes a first function and includes a first light-emitter;
   a second functional circuitry that executes a second function and includes a second light-emitter, the second function being different from the first function; and
   a light-emitting controller for controlling, based on first and second identification information that respectively identify the first and second functional circuitry, first and second mode signals that respectively control light amounts of the first and second light-emitters and are respectively acquired via the communicator in association with the first and second identification information, and first and second lamp signals respectively generated based on operation states of the first and second functional circuitry, the first and second light-emitters respectively provided in the first and second functional circuitry identified by the first and second identification information to respectively indicate the operation states of the first and second functional circuitry in the light amounts respectively controlled by the first and second mode signals,
wherein each of the first and second functional circuitry includes at least one of a motherboard, a power source, a fan, and a PCI expansion device of the server, the second functional circuitry including at least one of the motherboard, the power source, the fan, and the PCI expansion device other than that included in the first functional circuitry,
wherein when the first or second functional circuitry includes the fan, the first or second lamp signal generated in the first or second functional circuitry including the fan indicates operation state including whether or not the fan is rotating normally.

11. A server management system comprising:
a server management device connected to a network; and
a server including:
   a communicator for communicating with the server management device via the network;
   a first functional circuitry that executes a first function and includes a first light-emitter;

a second functional circuitry that executes a second function and includes a second light-emitter, the second function being different from the first function; and a light-emitting controller for controlling, based on first and second identification information that respectively identify the first and second functional circuitry, first and second mode signals that respectively control light amounts of the first and second light-emitters and are respectively acquired via the communicator in association with the first and second identification information, and first and second lamp signals respectively generated based on operation states of the first and second functional circuitry, the first and second light-emitters respectively provided in the first and second functional circuitry identified by the first and second identification information to respectively indicate the operation states of the first and second functional circuitry in the light amounts respectively controlled by the first and second mode signals, wherein each of the first and second functional circuitry includes at least one of a motherboard, a power source, a fan, and a PCI expansion device of the server, the second functional circuitry including at least one of the motherboard, the power source, the fan, and the PCI expansion device other than that included in the first functional circuitry, wherein when the first or second functional circuitry includes the PCI expansion device, the first or second lamp signal generated in the first or second functional circuitry including the PCI expansion device indicates an operation state including a link state with the network and the operation state of the network card including an amount of traffic in communication.

12. A server management method comprising:
communicating with another device via a network; and
controlling, based on first and second identification information that respectively identify first and second functional circuitry, first and second mode signals that respectively control light amounts of first and second light-emitters and are respectively acquired via the communicator in association with the first and second identification information, and first and second lamp signals respectively generated based on operation states of the first and second functional circuitry, the first and second light-emitters respectively provided in the first and second functional circuitry identified by the first and second identification information to respectively indicate the operation states of the first and second functional circuitry in the light amounts respectively controlled by the first and second mode signals, wherein the first functional circuitry executes a first function and includes the first light-emitter and the second functional circuitry executes a second function and includes the second light-emitter, the second function being different from the first function, wherein each of the first and second functional circuitry includes at least one of a motherboard, a power source, a fan, and a PCI expansion device of the server, the second functional circuitry including at least one of the motherboard, the power source, the fan, and the PCI expansion device other than that included in the first functional circuitry, wherein when the first or second functional circuitry includes the motherboard, the first or second lamp signal generated in the first or second functional circuitry including the motherboard indicates operation state of the server including a device state, a power supply situation, and an access situation of an onboard local area network (LAN).

13. A server management method comprising:
communicating with another device via a network; and
controlling, based on first and second identification information that respectively identify first and second functional circuitry, first and second mode signals that respectively control light amounts of first and second light-emitters and are respectively acquired via the communicator in association with the first and second identification information, and first and second lamp signals respectively generated based on operation states of the first and second functional circuitry, the first and second light-emitters respectively provided in the first and second functional circuitry identified by the first and second identification information to respectively indicate the operation states of the first and second functional circuitry in the light amounts respectively controlled by the first and second mode signals, wherein the first functional circuitry executes a first function and includes the first light-emitter and the second functional circuitry executes a second function and includes the second light-emitter, the second function being different from the first function, wherein each of the first and second functional circuitry includes at least one of a motherboard, a power source, a fan, and a PCI expansion device of the server, the second functional circuitry including at least one of the motherboard, the power source, the fan, and the PCI expansion device other than that included in the first functional circuitry, wherein when the first or second functional circuitry includes the power source, the first or second lamp signal generated in the first or second functional circuitry including the power source indicates operation state including that an AC power is supplied, a DC power is supplied, and none of the power is supplied.

14. A server management method comprising:
communicating with another device via a network; and
controlling, based on first and second identification information that respectively identify first and second functional circuitry, first and second mode signals that respectively control light amounts of first and second light-emitters and are respectively acquired via the communicator in association with the first and second identification information, and first and second lamp signals respectively generated based on operation states of the first and second functional circuitry, the first and second light-emitters respectively provided in the first and second functional circuitry identified by the first and second identification information to respectively indicate the operation states of the first and second functional circuitry in the light amounts respectively controlled by the first and second mode signals, wherein the first functional circuitry executes a first function and includes the first light-emitter and the second functional circuitry executes a second function and includes the second light-emitter, the second function being different from the first function, wherein each of the first and second functional circuitry includes at least one of a motherboard, a power source, a fan, and a PCI expansion device of the server, the second functional circuitry including at least one of the motherboard, the power source, the fan, and the PCI expansion device other than that included in the first functional circuitry, wherein when the first or second functional circuitry includes the fan, the first or second lamp signal generated in the first or second functional circuitry including the fan indicates operation state including whether or not the fan is rotating normally.

15. A server management method comprising:

communicating with another device via a network; and controlling, based on first and second identification information that respectively identify first and second functional circuitry, first and second mode signals that respectively control light amounts of first and second light-emitters and are respectively acquired via the communicator in association with the first and second identification information, and first and second lamp signals respectively generated based on operation states of the first and second functional circuitry, the first and second light-emitters respectively provided in the first and second functional circuitry identified by the first and second identification information to respectively indicate the operation states of the first and second functional circuitry in the light amounts respectively controlled by the first and second mode signals, wherein the first functional circuitry executes a first function and includes the first light-emitter and the second functional circuitry executes a second function and includes the second light-emitter, the second function being different from the first function, wherein each of the first and second functional circuitry includes at least one of a motherboard, a power source, a fan, and a PCI expansion device of the server, the second functional circuitry including at least one of the motherboard, the power source, the fan, and the PCI expansion device other than that included in the first functional circuitry, wherein when the first or second functional circuitry includes the PCI expansion device, the first or second lamp signal generated in the first or second functional circuitry including the PCI expansion device indicates an operation state including a link state with the network and the operation state of the network card including an amount of traffic in communication.

* * * * *